(12) United States Patent
Eipper et al.

(10) Patent No.: US 6,546,602 B1
(45) Date of Patent: Apr. 15, 2003

(54) RELEASABLE CLOSURE

(75) Inventors: Konrad Eipper, Rottenburg (DE);
Wolfgang Fussnegger, Tuebingen (DE); Elke Hombergsmeier, Forstern (DE); Heinz Voggenreiter, Vaucresson (FR); Martin Weller, Fichtenberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/980,982

(22) PCT Filed: Apr. 5, 2000

(86) PCT No.: PCT/DE00/01059

§ 371 (c)(1),
(2), (4) Date: Feb. 22, 2002

(87) PCT Pub. No.: WO00/62637

PCT Pub. Date: Oct. 26, 2000

(30) Foreign Application Priority Data

Apr. 20, 1999 (DE) .......................................... 199 17 726

(51) Int. Cl.⁷ .............................. A44B 18/00; B32B 3/02
(52) U.S. Cl. .............................. 24/442; 24/446; 24/448; 24/450; 24/452; 24/304; 428/40.1; 428/97

(58) Field of Search .................... 24/442, 448, 450, 24/452, 446, 303, 304; 428/92, 97, 40.1, 96, 100

(56) References Cited

U.S. PATENT DOCUMENTS

| | | | | |
|---|---|---|---|---|
| 2,717,437 A | | 9/1955 | De Mestral ..................... 28/72 |
| 3,808,648 A | * | 5/1974 | Billarant et al. .............. 24/442 |
| 5,231,738 A | * | 8/1993 | Higashinaka ................ 24/450 |
| 5,369,852 A | * | 12/1994 | Higashinaka ................ 24/446 |
| 5,656,351 A | * | 8/1997 | Donaruma ................... 428/97 |
| 6,086,973 A | * | 7/2000 | Hazes ....................... 428/40.1 |

FOREIGN PATENT DOCUMENTS

DE            19648254            8/1998

* cited by examiner

Primary Examiner—Victor Sakran
(74) Attorney, Agent, or Firm—Davidson, Davidson & Kappel, LLC

(57) ABSTRACT

A detachable closure includes separable burr-type elements which, at surfaces to be joined, have interlocking elements which mutually interlock during joining of the burr-type elements and hold the burr-type elements together. The interlocking elements are made of a material which carries out a deformation under the influence of heat, electromagnetic radiation, and/or a magnetic field.

13 Claims, 2 Drawing Sheets

RELEASABLE CLOSURE

BACKGROUND

The present invention relates to a detachable closure made of separable burr-type elements which feature interlocking elements at the surfaces to be joined, the interlocking elements mutually interlocking during the joining of the burr-type elements, holding the burr-type elements together.

In many fields of technology, detachable closures are used to non-permanently interconnect parts. In this manner, the possibility ensues for parts to be firmly fixed but nevertheless to be detached again.

Known from U.S. Pat. No. 2,717,437 is a detachable closure which is composed of two burr-type elements which feature a large number of flexible interlocking elements which interlock with each other when the burr-type elements are pressed together. In this manner, a multitude of connections ensues between the interlocking elements of the two burr-type elements, resulting in a strong mutual fixation of the burr-type elements. This type of closures is also known as a Velcro closure and is used in the field of the clothing industry.

It turns out to be a disadvantage of detachable closures of that kind that the connection can only be detached by stripping off the burr-type elements from each other and in that shear forces act upon the interlocking elements. The elastic design of the interlocking elements, on one hand, prevents the interlocking elements from being released out of the burr-type elements in the process and, on the other hand, supports the separation. Thus, the interlocking elements can be bent open to let opposite interlocking elements slip out of the interlocking connection. In a closure of this kind, the connection can only be separated if at least one of the components to be joined is flexurally soft or if the components can be sheared off from each other. A separation of the components in a direction perpendicular to the surface, as occurs in the case of flexurally stiff components which cannot be tilted relative to each other, is only possible with an excessive expenditure of force which mostly destroys the detachable closure at the same time.

German Patent Document 196 48 254 describes a pressure closure strap which has two matching profiles and in which at least one profile half of the pressure closure strap is intentionally designed to be self-destructive. The destruction of at least one half during the separation of previously joined strap halves has as a result that a repeated use is not possible. The self-destruction can be attained either via predetermined breaking points at the tops of the profile ribs gripping behind each other or by elastomers which have a shape memory and which, after being put together, are shrunk so as to interlock, and which, during separation, take on a shape which prevents a repeated closure.

SUMMARY OF THE INVENTION

An object of the present invention is to provide a detachable closure that can be detached in a controlled manner without using large shear forces. Moreover, an object is for the interconnection to be separable in a direction perpendicular to the surface.

To attain this objective according to the present invention, a detachable closure of the type mentioned at the outset is characterized in that the interlocking elements are composed of a material which carries out a deformation in response to the influence of heat.

Using the closure according to the present invention, it is possible for the components which are held together therewith to be detached without having to apply shear forces via stripping abrading movements. This allows the components to be lifted off in the direction of the surface normal. Besides, it is no longer required that one component be flexurally soft. Secondly, due to the possibility of detaching the interlocking connection in a defined manner, the required expenditure of force is reduced to a minimum since it is no longer necessary to apply energy for deforming the elastic interlocking elements until the final separation.

The heat can be introduced into the interlocking elements by indirectly heating the components or the burr-type elements. Advantageously however, the heat is brought about by current flowing through the interlocking elements to be changed. The resistance offered to the current flow by the interlocking elements causes the current to be converted into Joulean heat, resulting in the heating of the elements. This heating causes the shape of the interlocking elements to open.

According to the present invention, the set objective can also be achieved in that the interlocking elements are composed of a material which carries out a deformation in response to the influence of electromagnetic radiation.

In both design approaches, bimetals or expansion material elements can be used as materials for the interlocking elements. In a preferred embodiment, however, the interlocking elements are composed of a shape memory alloy. Compared with conventional structured materials, shape memory alloys additionally offer special properties which make it possible to use them in the mentioned environment. Due to the capability of remembering a specific shape in the low-temperature martensite phase and in the high-temperature austenite phase, it is possible for deformations to be achieved over a previously set temperature range over a large number of cycles.

In connection with the austenitic-martensitic phase transformation and the associated deformation, it is possible to take advantage of two effects. Via the one-way effect, an interlocking element made of a shape memory alloy which was bent closed, i.e., plastically deformed, in the temperature range in which the alloy exists in the martensitic phase, begins to open again when it is heated beyond the temperature at which the transformation into the austenitic phase begins. The alloy begins to "remember" the original shape so that a deformation is carried out in a controlled manner via heat supply, detaching an interlocking connection. In this manner, it becomes possible for the detachable connection to be opened one time in a controlled manner in the desired form.

It is advantageous to impress reshapings on the interlocking elements of shape memory alloys via a so-called "training" which allows the interlocking elements to remember a specific shape both in the austenitic phase and in the martensitic phase. In this context, an open interlocking element and a closed interlocking element are conceivable. To this end, dislocation structures are impressed on the interlocking element made of a shape memory alloy by deforming the alloy beyond the martensite plateau. These dislocation structures restore the alloy to the desired shape also during cooling. In this manner, the detachable connection can be cyclically detached or joined several times by increasing or reducing the temperature of the interlocking elements, depending on the requirements. Thus, not only a controlled detachment but also an active joining becomes possible if required by the circumstances as is the case, for instance, subsequent to an exact positioning of the components.

Shape memory alloys which can be used for the interlocking elements include a plurality of materials such as special alloys of copper, zinc and aluminum or iron, manganese and silicon. Here, the use depends on the temperature range in which the detachable closure is intended to be used and on the temperature at which the deformation begins and, thus, at which the detachment of the closure is accomplished. Advantageously however, the shape memory alloy is composed of a nickel titanium alloy which is composed of 49.9 atom % of nickel and 50.1 atom % of titanium. The advantage of this alloy lies in the commercial availability, the large operating-temperature range, and in the large number of thermal cycles that can be performed with this material.

According to an embodiment of the present invention, the interlocking elements are composed of a material which carries out a deformation in response to the influence of electromagnetic fields.

Used as materials for this purpose are, in particular, electro- and magnetostrictive solid bodies as, for example, piezoelectric ceramics or polymeric materials.

Preferably, the interlocking connection of the interlocking elements is eliminated by the degree of the deformation resulting from the influence of heat, electromagnetic radiation and electromagnetic fields. In this context, the regions of the interlocking elements which offer resistance to the opposite interlocking elements of the other burr-type elements and which thus bring about the connection are changed to the extent that the interlocking elements can be separated from each other without much expenditure of force.

The shape of the interlocking elements is to be selected in such a manner that it is ensured that the interlocking elements of the two burr-type elements mutually interlock during the joining, thus fixing the burr-type elements relative to each other. Preferably however, the interlocking elements of one burr-type element are hook-shaped and those of the other burr-type element are loop-shaped. An embodiment of that kind ensures a particularly easy interlocking as the burr-type elements are pressed together since the hook-shaped interlocking elements easily entangle in the loop-shaped interlocking elements, resulting in the mutual fixation of the elements and, thus, in the union. However, it is also possible to attach hook-shaped interlocking elements on both sides of the burr-type elements, the hook-shaped interlocking elements mutually interlocking.

Preferably, the number of loop-shaped interlocking elements per surface unit on one burr-type element is larger than the number of hook-shaped interlocking elements on the other burr-type element. In this manner, it is ensured that as the burr-type elements are brought together, a large number of hook-shaped interlocking elements find a companion, that is to say a loop-shaped interlocking element to secure the connection between the burr-type elements in the best possible manner. In this manner, the force required for an unwanted separation of the burr-type elements is maintained at as high a level as possible. This force is a measure for the quality of the detachable closure since the detachable closure must be protected against unwanted detachment due to influences of external forces.

In a particularly preferred embodiment, the deformation of the loop-shaped interlocking elements which causes a detachment of the interlocking connection consists in the formation of a gap so that an interlocking element of the opposite burr-type element entangled therein can slip out. This gap formation is preferably attained in that the loop wings forming the loop are abutted on each other at an obtuse angle or in that they overlap each other in the region of the gap to be formed and in that they move away from each other during the deformation so as to form the gap. In the case of the hook-shaped interlocking elements, the deformation which causes the detachment of the interlocking connection is an elongation of the hook bow so that an interlocking element of the opposite side entangled therein can be drawn off without expenditure of force.

BRIEF DESCRIPTION OF THE DRAWINGS

In the following, the present invention will be explained in greater detail by way of an exemplary embodiment depicted in drawings from which further details, features and advantages can be gathered.

DETAILED DESCRIPTION

Figure 1:
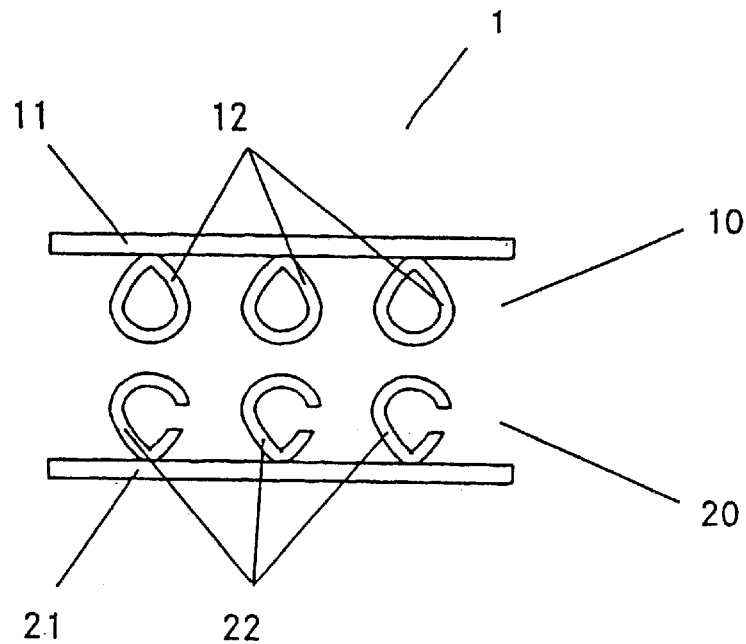
FIG. 1 shows a schematic representation of two interlocking elements in the unclosed condition.

The system schematically shown in FIG. 1 is a cross-section through a detachable closure 1 which, in the present case, is composed of two burr-type elements 10, 20. Burr-type elements 10, 20 include two sheet structures 11, 21 and interlocking elements 12, 22, the interlocking elements being formed on first burr-type element 10 in the form of loops and on second burr-type element 20 in the form of hooks.

In the specific embodiment represented here, first burr-type element 10 possesses a higher quantity per unit area of loop-shaped interlocking elements 12 than the quantity per unit area of hook-shaped interlocking elements 22 at second burr-type element 20. In this manner, it is ensured that all hook-shaped interlocking elements 22 entangle at least in one loop-shaped interlocking element 12, thus mutually fixing the burr-type elements and augmenting the expenditure of force required for the unwanted detachment of the closure. The entire first burr-type element 10, sheet structure 21 is also manufactured from a polyamide fiber in that, during a weaving process, numerous small loops are pulled out of sheet structure 11, forming loop-shaped interlocking elements 12. In second burr-type element 20, sheet structure 21 is also composed of a woven polyamide fiber in which a wire made of a nickel-titanium alloy was woven during the manufacturing process in such a manner that, initially, loops are formed which project above the burr-type element and which, in a subsequent process, are cut open on one side so as to form hook-shaped interlocking elements 22. Here, a cutting in the middle would also be conceivable. The alloy wire has a diameter of 0.2 mm and is composed of 49.9 atom % of nickel and 50.1 atom % of titanium. This material is a shape memory alloy and is known for the fact that it undergoes a deformation during the transition between the martensitic and austenitic phases which is used here for opening the interlocking elements. However, interlocking elements 20 can also be composed of other shape memory alloys so that the detachable closure can be adapted to different temperature ranges. Likewise, it is possible to use a different fiber for burr-type element 10 and sheet structure 21 in lieu of the polyamide fiber used here. On the whole, other materials and manufacturing methods are, of course, possible as well. Thus, it is possible for sheet structures 11, 21 to be formed of a plastic plate and for interlocking elements 12, 22 to be cast in. Likewise, it is conceivable for interlocking elements 11, 22 to be introduced directly into the surfaces of the components to be joined so as to integrate the sheet structures into the components and save costs. Moreover, it is possible for loop-shaped interlocking elements 12 to be composed of metal or a metal alloy. This information is to be regarded as being only exemplary but not as a limitation of the present invention.

Figure 2:
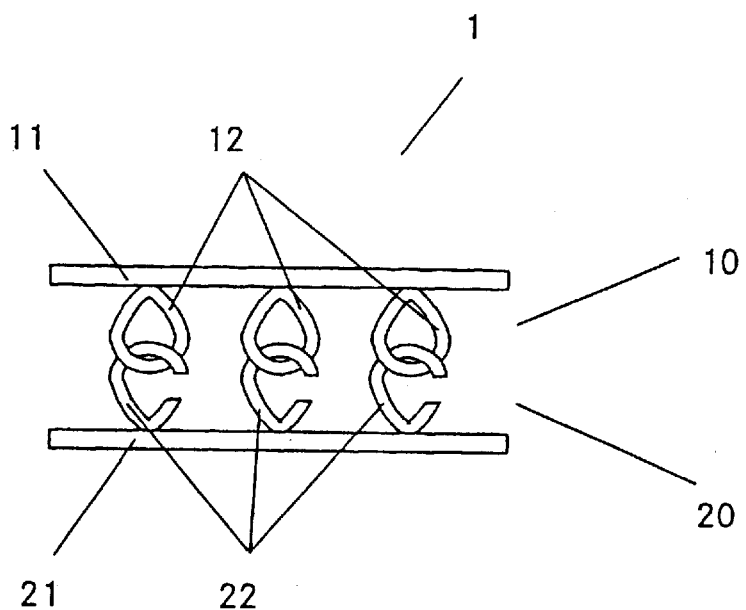
FIG. 2 shows the interlocking elements during the formation of a detachable closure.

When the two burr-type elements 10, 20 are pressed together, hook-shaped interlocking elements 22 interlock with loop-shaped interlocking elements 12 as is depicted in FIG. 2. If burr-type elements 10, 20 are attached to two components via sheet structures 11, 21, the components are joined in this way. Due to their material, hook-shaped interlocking elements 22 are fluxurally stiff so that a separation of the components at this stage can only be accomplished with extremely large expenditure of force and only via shear forces transverse to the surface.

Figure 3:
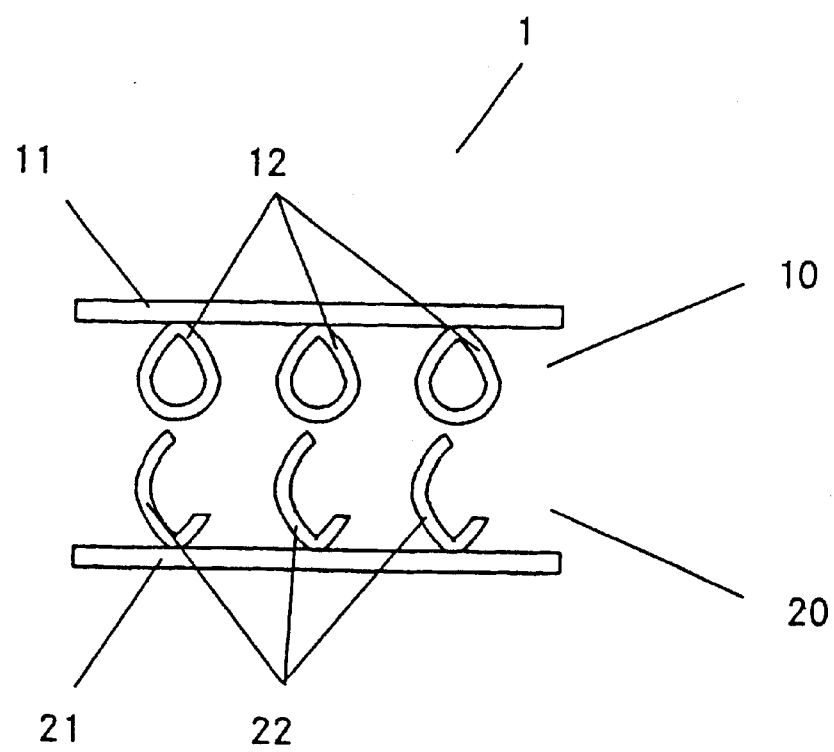
FIG. 3 shows the closure during active detachment or during active joining.

FIG. 3 shows the detachment process which, in the present exemplary embodiment, is induced by heat radiation up to a temperature of approximately 90° C. In this context, two effects can be taken advantage of.

In the case of the so-called "one-way effect", the shape memory alloy which was pseudoplastically deformed in the martensitic structure remembers its original shape when heated and returns to its undeformed condition during the transition to the high-temperature austenite phase. The plastic deformation mentioned here gets into hook-shaped interlocking elements 22 during the weaving process when a loop which will later be cut open is formed from the originally straight alloy wire. Of course, the deformation can also be brought in in a different manner, depending on the manufacturing process. In the case of the one-way effect, the alloy, and thus hook-shaped interlocking elements 22, does not change its shape again so that the connection cannot be closed any more and is usable only once unless hook-shaped interlocking elements 22 are deformed again via an external force, for example, as burr-type element 10, 20 are pressed together.

Via the so-called "two-way effect", it is possible for the connection to be detached as described for the one-way effect and also to be reused for further connections. Possible is, moreover, an active joining. The two-way effect describes the fact that a shape memory alloy is capable of remembering both a specific shape in the high-temperature austenite phase and one in the low-temperature martensite phase. In this connection, the transformation is impressed on the shape memory alloy by several load cycles, the so-called "training". In the process, the alloy is deformed in the martensitic phase beyond the martensite plateau so as to bring in plastic deformations by dislocations as well. Due to the dislocations, only part of the deformation component disappears during heating. During cooling, the existing plastic stress fields around the dislocations give rise to martensite variants which transform the alloy into the desired low-temperature shape. Here too, the deformation beyond the martensite plateau is brought into interlocking elements 22 during the weaving process.

By using this effect, it is possible for the connection to be detached via heating in that hook-shaped interlocking elements 22 stretch during heating. When cooling, hook-shaped interlocking elements 22 form back so that a further joining operation is possible. However, burr-type elements 10, 22 can also be joined with hook-shaped interlocking elements 22 being open and then be cooled as a result of which an active, multidimensional joining is possible.

Of course, the one-way or two-way effects can be used analogously if, in place of hook-shaped interlocking elements 22, loop-shaped interlocking elements 12 open and release the connection or if hook-shaped interlocking elements 22 are used on both burr-type elements 10, 20.

Via the mentioned means, a joining which is known form the Velcro closure is possible which brings about a very strong bond between the components to be joined.

In addition, however, the separation of the components is achieved actively by radiation of heat as a result of which no force needs to be applied for the separation and the need for the shear motion of the components to be detached is eliminated.

What is claimed is:

1. A detachable closure comprising:
    a first burr-type element including a plurality of first interlock elements; and
    a second burr-type element including a plurality of second interlock elements; wherein
        the plurality of first and second interlock elements are configured for mutually interlocking during a joining of the first and second burr-type elements so as to separably hold the burr-type elements together; and
        each of the plurality of first and second interlock elements includes a respective material which deforms in response to as least one of heat, electromagnetic radiation, and an electromagnetic field so as to disestablish the interlocking of the plurality of first and second interlock elements.

2. The detachable closure as recited in claim 1 wherein each of the plurality of first and second interlock elements includes a respective resistance heater.

3. The detachable closure as recited in claim 1 wherein each of the plurality of first and second interlock elements includes a respective shape memory alloy.

4. The detachable closure as recited in claim 3 wherein each of the respective shape memory alloy has a respective form in which plastic deformations exist via dislocations in a respective grain structure.

5. The detachable closure as recited in claim 3 wherein at least one of the respective shape memory alloy includes 49.9 atom % of nickel and 50.1 atom % of titanium.

6. The detachable closure as recited in claim 1 wherein the plurality of first interlock elements are hook-shaped and the plurality of second interlock elements are loop-shaped.

7. The detachable closure as recited in claim 6 wherein a number of the plurality of second interlock elements per unit surface area is larger than a number of the plurality of first interlock elements per unit surface area.

8. The detachable closure as recited in claim 6 wherein the deforming of the respective material included in each of the plurality of second interlock elements causes a forming of respective gaps and the deforming of the respective material included in each of the plurality of first interlock elements causes respective elongations.

9. The detachable closure as recited in claim 6 wherein the deforming of the respective material included in each of the plurality of first and second interlock elements causes respective elongations.

10. The detachable closure as recited in claim 7 wherein the deforming of the respective material included in each of the plurality of second interlock elements causes a forming of respective gaps and the deforming of the respective material included in each of the plurality of first interlock elements causes respective elongations.

11. The detachable closure as recited in claim 1 wherein the plurality of first and second interlock elements are hook-shaped.

12. A method for detachably connecting a first component to a second component, the method comprising:
   undetachably disposing a first burr-type element on the first component, the first burr-type element including a plurality of first interlock elements;
   undetachably disposing a second burr-type element on the second component, the second burr-type element including a plurality of second interlock elements; and
   joining the first and second burr-type elements so as to interlock the plurality of first and second interlock elements and separably hold the burr-type elements together, each of the plurality of first and second interlock elements including a respective material which deforms in response to as least one of heat, electromagnetic radiation, and an electromagnetic field so as to disestablish the interlocking of the plurality of first and second interlock elements.

13. A method for detachably connecting a first component to a second component, the method comprising:
   providing a plurality of first interlock elements on a first surface of the first component;
   providing a plurality of second interlock elements on a second surface of the second component; and
   joining the first and second components so as to interlock the plurality of first and second interlock elements and separably hold the first and second components together, each of the plurality of first and second interlock elements including a respective material which deforms in response to as least one of heat, electromagnetic radiation, and an electromagnetic field so as to disestablish the interlocking of the plurality of first and second interlock elements.

* * * * *